US012761978B2

(12) United States Patent
Mink et al.

(10) Patent No.: US 12,761,978 B2
(45) Date of Patent: Oct. 13, 2026

(54) CLIENT WORKLOAD SHARING WITH NEURAL PROCESSING UNIT ENABLED DOCK

(71) Applicant: DELL PRODUCTS L.P., Round Rock, TX (US)

(72) Inventors: Jacob Mink, Cedar Park, TX (US); Balasingh Samuel, Round Rock, TX (US); Mitchell Markow, Hutto, TX (US)

(73) Assignee: Dell Products L.P., Round Rock, TX (US)

(*) Notice: Subject to any disclaimer, the term of this patent is extended or adjusted under 35 U.S.C. 154(b) by 35 days.

(21) Appl. No.: 18/926,570

(22) Filed: Oct. 25, 2024

(65) Prior Publication Data

US 2026/0119274 A1 Apr. 30, 2026

(51) Int. Cl.
*G06F 9/50* (2006.01)
*G06F 1/16* (2006.01)

(52) U.S. Cl.
CPC .......... *G06F 9/5088* (2013.01); *G06F 1/1632* (2013.01)

(58) Field of Classification Search
None
See application file for complete search history.

(56) References Cited

U.S. PATENT DOCUMENTS

| | | | |
|---|---|---|---|
| 11,194,740 B2* | 12/2021 | Campbell | G06F 1/1632 |
| 11,593,178 B2 | 2/2023 | Khosrowpour et al. | |
| 2019/0079777 A1* | 3/2019 | Huang | G06F 13/4282 |
| 2023/0056042 A1 | 2/2023 | Vichare et al. | |

* cited by examiner

*Primary Examiner* — Scott C Sun
(74) *Attorney, Agent, or Firm* — Larson Newman, LLP

(57) ABSTRACT

An information handling system selects a docking station to execute a workload. In response to the selection of the docking station, the information handling system configures the docking station to execute the workload using a sideband connection between the information handling system and the docking station. Subsequent to the configuration of the docking station using the sideband connection, the information handling system offloads the workload to the docking station via a primary connection between the information handling system and the docking station. Further, the information handling system receives results of the workload from the docking station via the primary connection.

20 Claims, 5 Drawing Sheets

CLIENT WORKLOAD SHARING WITH NEURAL PROCESSING UNIT ENABLED DOCK

FIELD OF THE DISCLOSURE

The present disclosure generally relates to information handling systems, and more particularly relates to client workload sharing with neural processing unit enabled dock.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may be configured to select a docking station to execute a workload. In response to the selection of the docking station, the information handling system may configure the docking station to execute the workload using a sideband connection between the information handling system and the docking station. Subsequent to the configuration of the docking station using the sideband connection, the information handling system may offload the workload to the docking station via a primary connection between the information handling system and the docking station. Further, the information handling system may receive results of the workload from the docking station via the primary connection.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Emerging computations in artificial intelligence (AI) often require native computation to extract maximum efficiency from a client device. However, on-the-box client applications and system resources are becoming a limiting factor in the availability of computing for AI workloads to run. Neural processing unit (NPU) enabled peripherals, in particular docks, also referred to as docking stations, offer a secure and efficient alternative to local computing devices for running AI workloads. Accordingly, the present disclosure provides a system and method for client AI workload sharing with NPU enabled docks.

Figure 1:
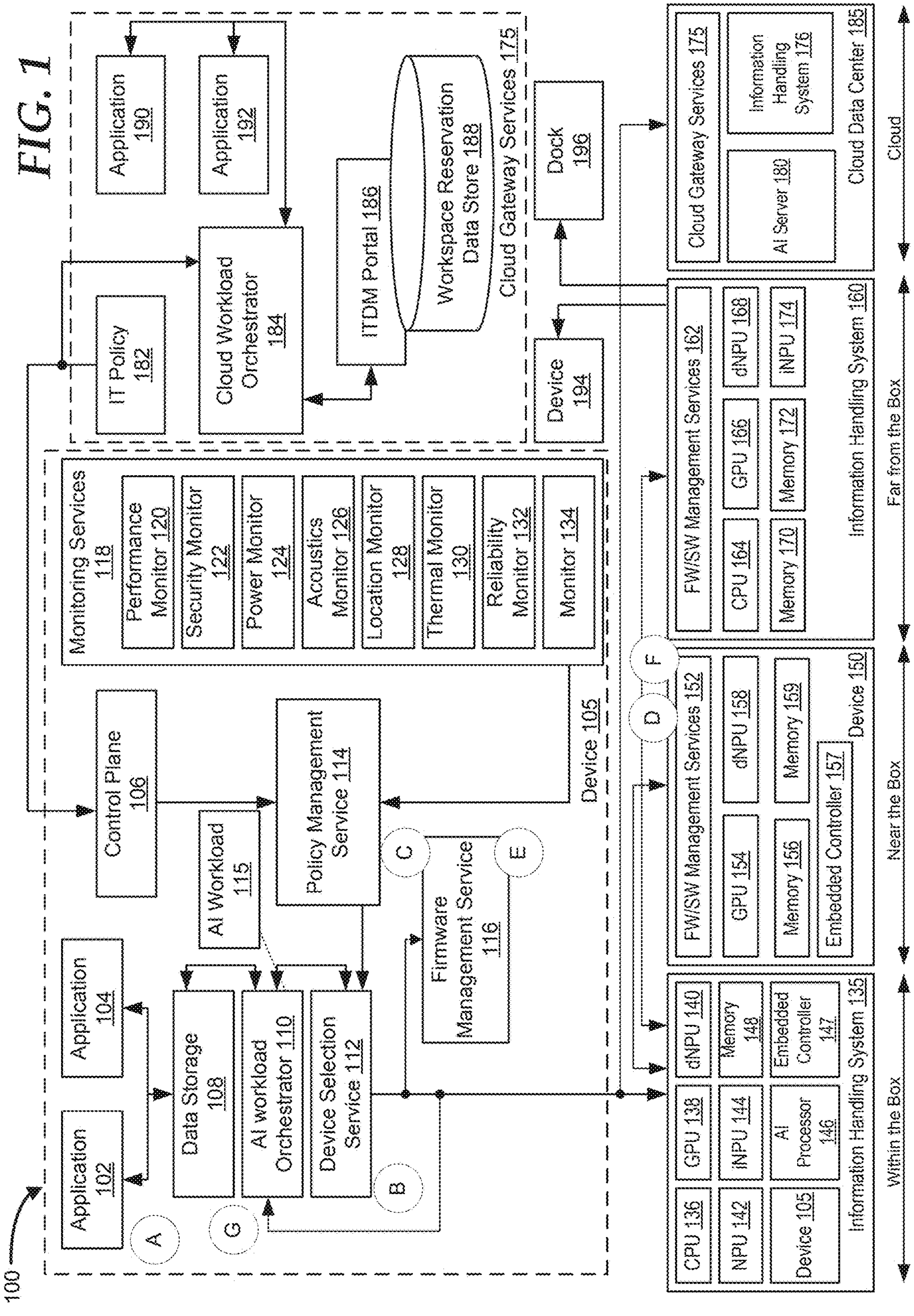
FIG. 1 is a block diagram of a distributed system of information handling systems for client workload sharing with a neural processing unit (NPU) enabled dock, according to an embodiment of the present disclosure.

FIG. 1 illustrates a portion of a distributed system environment 100 for client workload sharing with an NPU enabled dock, according to an embodiment of the present disclosure. Distributed system environment 100 includes a set of communicatively coupled information handling systems or compute devices, such as information handling systems 135 and 160, a device 150, and a cloud data center 185. Local and remote information handling systems in distributed system environment 100 may be communicatively linked either by hardwired data links, wireless data links, or a combination of hardwired and wireless data links through a network.

The network may be a public network, such as the Internet, a physical private network, a wireless network, a virtual private network, or any combination thereof. The network may be implemented as or may be implemented as or may be a part of, a storage area network, a personal area network, a local area network, a metropolitan area network, a wide area network, a wireless local area network, an intranet, or any other appropriate architecture or system that facilitates the communication of signals, data, and/or messages.

Information handling systems generally process, compile, store, and/or communicate information or data for business, personal, or other purposes thereby allowing users to take advantage of the value of the information. Nevertheless, a continually growing number of information handling systems and devices are being enhanced with AI services, such as heuristic learning, machine learning, deep learning, reinforcement learning services, and the like. Currently, most AI services are performed in central processing units (CPUs), graphics processing units (GPUs), system on chips (SOCs), NPUs, or other processors of the information handling system.

As the number of AI services increases, so will the need for computing resources to execute AI models, which include machine learning models, deep learning models, language models, or similar. Nevertheless, executing AI services in the information handling system, such as on-the-box (OTB) can inadvertently affect end-user productivity and negatively exhibit adverse effects, such as reduced battery life, system performance, and overall end-user experience. Conventional techniques to address this problem include AI hardware accelerators and AI software accelerators. However, these accelerators can be busy performing other tasks. In addition, these accelerators can be expensive and thus may not get integrated into low-cost platforms. Accordingly, embodiments of the present disclosure provide a system and method for preemptive and secure transitioning of AI workload to a premium information handling system, such as a dock using workspace reservation information.

Figure 5:
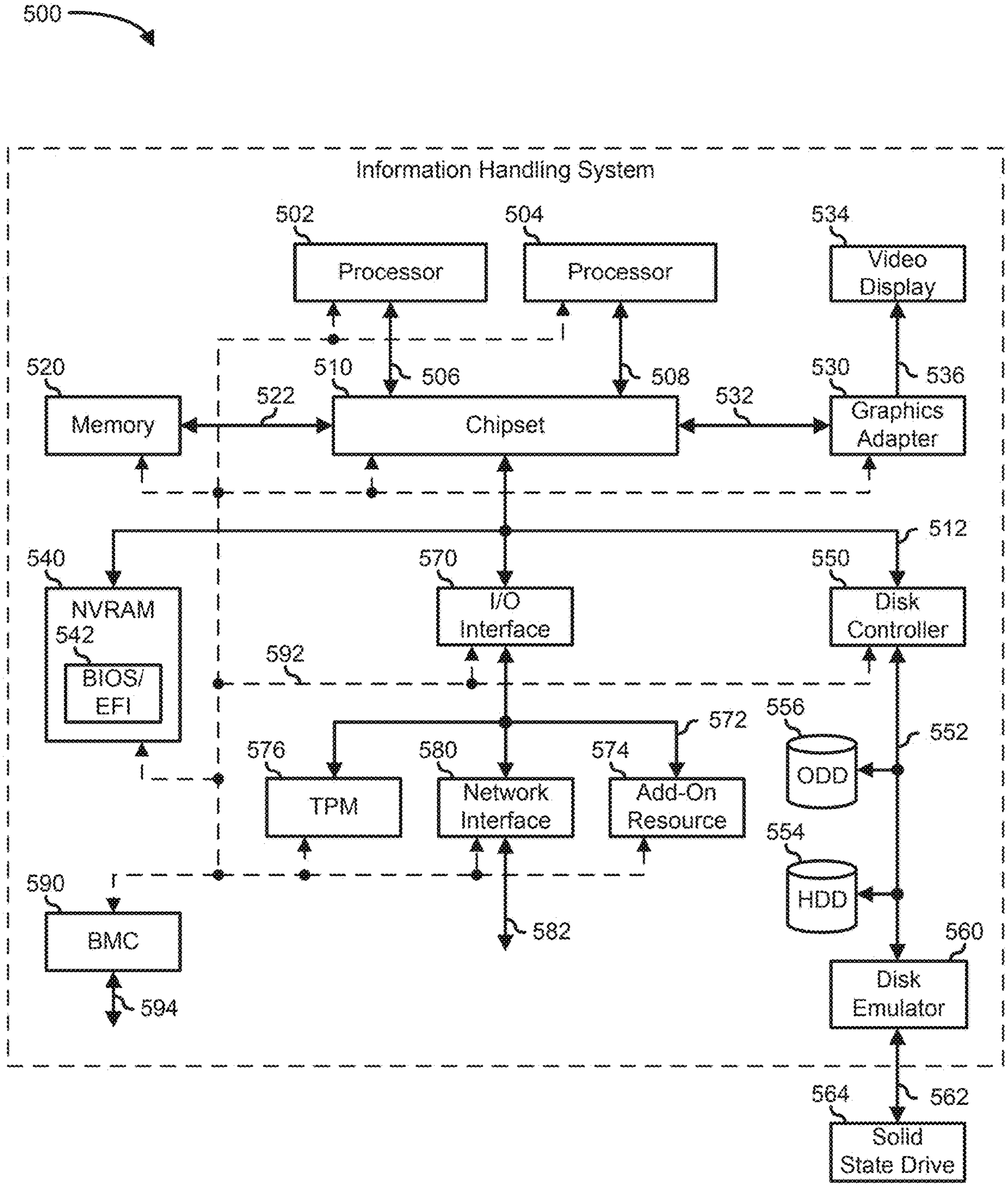
FIG. 5 is a block diagram of an information handling system for client workload sharing with an NPU enabled dock, according to an embodiment of the present disclosure.

Information handling system 135, which is similar to information handling system 500 of FIG. 5 may be a personal computer, a desktop computer system, a laptop computer system, a server computer system, a mobile device, a tablet computing device, a personal digital assistant, a consumer electronic device, an electronic music player, an electronic camera, an electronic video player, a wireless access point, a network storage device, or any other suitable computing device. Information handling system 135 may also be a portable information handling system that may include a laptop, a notebook, a smartphone, a tablet, or a personal digital assistant, among others. In one example, information handling system 135 may be an employee's corporate laptop that he or she docks into device 150 upon arrival at a cubicle.

Information handling system 135 may be communicatively coupled to device 150 and information handling system 160. Information handling system 135 may also be communicatively coupled to cloud data center 185 via the Internet. In this example, information handling system 160 is communicatively coupled with a device 194 and a dock 196. Device 194 may be similar to device 105 while dock 196 may be similar to device 150. However, any variety of connections between various components of distributed system environment 100, such as connections between information handling systems 135 and 160, devices 105 and 194, and dock 196 with cloud data center 185 are envisioned as falling within the scope of the present disclosure. In addition, connections between components and within the various components of distributed system environment 100 are also envisioned as falling within the scope of the present disclosure. In addition, connections between components and within the various components may be omitted for descriptive clarity.

Information handling system 135 includes a device 105, a CPU 136, a GPU 138, a discrete NPU (dNPU) 140, an NPU 142, an integrated NPU (INPU) 144, an AI processor 146, an embedded controller 147, and a memory 148. CPU 136, which is similar to processors 502 and 504 of FIG. 3, may be configured to execute instructions of an application, such as applications 102 and 104. CPU 136 may also be configured to execute instructions associated with an AI workload orchestrator 110, a device selection service 112, a policy management service 114, and a firmware management service 116. In addition, CPU 136 along with GPU 138, dNPU 140, NPU 142, INPU 144, and AI processor 146 may be configured to execute an AI workload, such as AI workload 115.

GPU 138, which may be similar to a graphics adapter 530 of FIG. 5 may comprise any system, device, or apparatus configured to process graphical or visual content and to communicate that content to a monitor or display where the content may be rendered. An NPU may comprise any system, device, or apparatus, such as a hardware accelerator that is designed for AI and ML tasks. NPUs are optimized to handle the complex computations required by deep learning algorithms. This optimization makes NPUs efficient at processing AI tasks, such as natural language processing, image analysis, and more. NPUs utilized by information handling system 135 may be of various types including dNPU 158, INPU 144, and AI processor 146. DNPU may be a discrete NPU, such as an NPU in a USB stick. An NPU may also be integrated with information handling system 135. INPU 144 may be connected via an m.2 slot within information handling system 135. AI processor 146 may comprise any system, device, or apparatus configured to process AI workloads.

Embedded controller 147, which may be similar to BMC 590 of FIG. 5, may comprise any system, device, or apparatus configured with a sideband connection to embedded controller 157. The sideband connection may be used to configure device 150 to execute AI workload 115. The sideband connection may also be used to transmit information from embedded controller 157 subsequent to the configuration of device 150.

Memory 148, which is similar to a memory 520 of FIG. 5, may comprise a non-volatile memory accessible by CPU 136, GPU 138, dNPU 140, NPU 142, INPU 144, device 105, or AI processor 146. However, each one of the aforementioned may be associated with a separate non-volatile memory device. Memory 148 may include a static random access memory (SRAM), a dynamic random access memory (DRAM), or any suitable device to support high-speed memory operations. In certain embodiments, memory 148 may combine both persistent, non-volatile memory and volatile memory. In certain embodiments, memory 148 may include multiple removable memory modules.

Device 105 includes a control plane 106, a data storage 108, AI workload orchestrator 110, device selection service 112, policy management service 114, firmware management service 116, and applications 102 and 104. Applications 102 and 104 are applications installed locally on device 105, also referred to as on-the-box (OTB) applications. For example, application 102 may be a video telephony software program while application 104 may be a natural language processing application.

Control plane 106 may be configured to control or route data received from cloud gateway services 175 to one or more components of information handling system 135, such as policy management service 114. In one example, control plane 106 may route IT policy 182 to device selection service 112. Data storage 108 may be a persistent data storage device. Data storage 108 may include solid-state disks, hard disk drives, magnetic tape libraries, optical disk drives, magneto-optical disk drives, compact disk drives, compact disk arrays, disk array controllers, and/or any computer-readable medium operable to store data. Data storage 108 may include a database or a collection of files that is a central repository of data associated with workloads that are accessible by AI workload orchestrator 110 and applications 102 and 104. For example, AI workload orchestrator 110 and applications 102 and 104 may retrieve, store, and utilize data stored in data storage 108.

AI workload orchestrator 110 may be configured to monitor, control, and/or manage AI workloads instantiated using a CPU, GPU, NPU, or similar, such as AI workload 115. AI workload 115 generally refers to data associated with an AI service that is to be performed to generate one or more inferences based on the data. For example, AI workload 115 may include a set of input data, such as telemetry data, past profile recommendations, machine learning hints from other AI services, etc., that may be processed to generate one or more inferences. As such, AI workload 115 may include machine learning and deep learning workloads, such as tasks performed by AI systems which typically involve processing large amounts of data and performing complex computations.

For example, a typical machine learning workflow may include building a model from a sample dataset, evaluating the model against one or more additional sample datasets to decide whether to keep the model and to benchmark how good the model is, using the model in production to make predictions or decisions against live input data captured by an application. The training set, validation set, and/or test set can respectively include pairs of input datasets and output datasets that correspond to the respective input datasets.

Device selection service 112 may comprise any system, device, or apparatus configured to determine a physical and/or virtual device or information handling system to process or transition an AI workload according to a policy, such as IT policy 182. For example, device selection service 112 may determine whether to transition AI workload 115 to a trusted device or information handling system within distributed system environment 100 that includes an AI processor capable of executing an AI workload. An AI processor includes a GPU, CPU, NPU, dNPU, iNPU, or similar that is capable of executing an AI workload. Typically, an OTB AI processor is prioritized over a "near the box" device or information handling system. However, the "near the box" device or information handling system is generally prioritized over a "far from the box" device or information handling system. Accordingly, the "far from the box" AI processor or information handling system is generally prioritized over a cloud resource.

Device selection service 112 and/or AI workload orchestrator 110 may gather data or information from monitoring services 118 or its components. The data or information may include current performance, power utilization, and acoustic and thermal levels, among others to characterize the current state or utilization of one or more components of information handling system 135. This information may be utilized to determine whether to offload AI workloads according to policy, such as IT policy 182 provided by policy management service 114. Policy management service 114 may comprise any system, device, or apparatus configured to manage, monitor, and/or control IT policies, such as policies associated with AI workload transitions.

Firmware management service 116 may comprise any system, device, or apparatus configured to communicate with relevant hardware post-device selection. For example, firmware management service 116 may interface with a specific vendor application programming interface (API) to an OTB hardware, to a hardware connected to information handling system 135, or it may pass through to external components in order to run the workload. Firmware management service 116 may configure a peripheral device and/or a dock to execute a workload via embedded controller 147. In a particular example, firmware management service 116 may configure device 105 via embedded controller 147 to execute AI workload 115.

Monitoring services 118 may be configured to monitor, control, and/or manage one or more features of information handling system 135 and/or device 105, such as the health and performance of device 105. As such, monitoring service 118 includes one or more monitoring services, wherein each monitoring service may monitor, control, and/or manage a feature of device 105. For example, monitoring service 118 includes a performance monitor 120, a security monitor 122, a power monitor 124, an acoustics monitor 126, a location monitor 128, a thermal monitor 130, a reliability monitor 132, and monitor 134. Monitoring services 118 can include other monitors or monitoring services than depicted herein as new information becomes available to information handling system 135 and/or monitoring services 118.

Performance monitor 120 may be configured to monitor, manage, and/or control the performance of device 105 and/or its components. For example, performance monitor 120 can collect performance metrics over time, at specified intervals, and generate logs that can be analyzed to identify system performance issues. Security monitor 122 may be configured to monitor, manage, and/or control security of device 105 and/or its components. For example, security monitor 122 can detect a security data threat with data associated with AI workload. Power monitor 124 may be configured to monitor, manage, and/or control power consumption of device 105 and/or its components. For example, power monitor 124 may determine the power consumption of each one of applications 102 and 104. Acoustics monitor 126 may be configured to monitor, manage, and/or control the acoustics level of device 105 and/or its components. For example, acoustics monitor 126 may provide a current acoustics level to performance monitor 120.

Location monitor 128 may comprise any system, device, or apparatus configured to determine the location and movement of information handling system 135, such as based on triangulation of network information or information accessible via the operating system, or a location subsystem, such as a global positioning system (GPS) module. Thermal monitor 130 may be configured to monitor, manage, and/or control thermal level of device 105 and/or its components. For example, thermal monitor 130 may receive temperature information from one or more temperature sensors. In addition, thermal monitor 130 may provide a current thermal level to performance monitor 120.

Reliability monitor 132 may comprise any system, device, or apparatus configured to monitor, manage, and/or control hardware or software issues that may affect the performance and reliability of information handling system 135. Monitor 134 may comprise any system, device, or apparatus configured to determine other information to be utilized by monitoring services 118 during the monitoring, managing, and/or controlling information handling system 135 and/or its components. For example, monitor 134 may be configured to support proximity sensors, including optical, infrared, and/or sonar sensors, which may be configured to provide an indication of a user's presence near information handling system 135, absence from information handling system 135, and/or distance from information handling system 135, such as near-field, mid-field, or far-field.

In general, computer networks are considered to be trusted according to the following rules: a. by default, provisioned information handling systems under the purview of an organization's information technology (IT) department are trusted by each other for many corporate information handling system users, and b. by default multiple systems registered with the same account are considered to be trusted for non-corporate users. IT administrators have the ability to create smaller groups within their organization, such as engineering laptops workstations, desktop computers, and based on the organization's policy on potential data sharing. Additionally, AI workload processes may consume a relatively large amount of processing resources, yet the results they provide often do not require instantaneous implementation, such as other process-intensive services. On certain conditions and based on the local resources, it could otherwise be better to send the data to another device or a trusted information handling system within an organization group with the capability to perform AI workloads, such as devices with "premium" AI capabilities like device 150. A premium device may include a dock, an M.2 connected NPU, a webcam, or similar that includes an AI processor.

Device 150 may be referred to as a "premium" device with AI processing capabilities that can be utilized to process an AI workload, such as a firmware/software (FW/SW) service 152, a GPU 154, a dNPU 158, memories 156 and 159, and embedded controller 157. Device 150 may be a dock or docking station, wherein information handling system 135 is connected, such as via a wired connection or a short-range wireless connection like Bluetooth®. Wi-Fi®, NearLink®, near-field communication (NFC), low-power wide-area network, ultra-wideband, Institutes of Electrical and Electronics Engineers (IEEE) 802.15, or similar. As such, device 150 may be a trusted device and classified as a "near the box" system relative to information handling system 135. In addition, physical devices or peripherals that are plugged in or associated with device 150 or other information handling systems that are physically connected to information handling system 135 or via a short-range wireless connection may also be classified as "near the box" devices or information handling systems. This includes a webcam, keyboard, monitor, or other devices that are connected to information handling system 135 and/or device 150.

FW/SW management service 152 may comprise any system, device, or apparatus configured to communicate with the relevant information handling system post-selection. For example, FW/SW management service 152 may interface with FIG. 1 illustrates a system 200 for a device, component, or information handling system that will be leveraged on the device itself in order to run the AI workload. Accordingly, FW/SW management service 152 may be configured to receive an AI workload, run the AI workload locally, and then return the result to the source or display the result to the user. For example, FW/SW management service 152 may communicate via APIs to another information handling system, component, device, or to a cloud workload orchestrator, such as cloud workload orchestrator 184. In another example, FW/SW management service 152 may communicate with AI workload orchestrator 110.

GPU 154, which is similar to GPU 138, may comprise any system, device, or apparatus configured to process graphical or visual content and to communicate that content to a monitor or display where the content may be rendered. DNPU 158 may be similar to dNPU 140. Device 150 may include other AI processing units, also referred to as AI processors, similar to NPU 142, INPU 144, and AI processor 146. Memories 156 and 159 may be similar to memory 148. In one embodiment, memory 156 may be accessible by GPU 154 while memory 159 may be accessible by dNPU 158. However, GPU 154 and dNPU 158 may also be configured to share one memory.

Embedded controller 157, which may be similar to BMC 590 of FIG. 5, may comprise any system, device, or apparatus configured to manage and/or control various functions of device 150, such as power management and management of certain operating modes of device 150. Embedded controller 157 may be configured to communicate with embedded controller 147 via a sideband connection. Embedded controller 157 may be communicatively coupled to FW/SW management services 152 which may be configured to run AI workload 115 on one of GPU 154, dNPU 158, or similar.

Information handling system 160 can be a physical or virtual computing device that includes an FW/SW management service 152, a CPU 164, a GPU 166, a dNPU 168, and memories 170 and 172. Information handling system 160 may also be coupled to device 194 and dock 196, which is similar to device 105 and device 150 respectively. In one embodiment, distributed system environment 100 may include a trusted workgroup that is configured in a trusted peer network. The trusted workgroup may include information handling systems 135 and 160, and device 150, wherein these information handling systems and devices may be configured with AI services. As such, information handling system 160 may be a "trusted peer" of information handling system 135. Thus, information handling system 160 may be available to share AI workload 115 similar to device 150. In this example, information handling system 160 may be deployed within a communication network but farther from information handling system 135 than device 150. For example, information handling systems 135 and 160 may be configured within a local area network. As such, information handling system 160 may be referred to as a "far from the box" system relative to information handling system 135. Accordingly, a computing device or information handling system that is configured within a local network similar to information handling system 160 may be deemed as far from the box relative to information handling system 135. For example, device 194 and dock 196 may also be deemed as far from the box.

FW/SW management service 162 may comprise any system, device, or apparatus configured with functionality that is similar to FW/SW management service 152. CPU 164 may comprise any system, device, or apparatus configured with functionality that is similar to CPU 136. GPU 166 may comprise any system, device, or apparatus configured with functionality that is similar to GPU 138. DNPU 168 may comprise any system, device, or apparatus configured with functionality that is similar to dNPU 140. INPU 174 may comprise any system, device, or apparatus configured with functionality that is similar to iNPU 144. Memories 170 and 172 may be configured similar to memory 148. In this example, memory 170 may be accessible by CPU 164 while memory 172 may be accessible by GPU 166. However, information handling system 160 may have more or less memories than shown. For example, information handling system 160 may have one memory that is accessible by CPU 164, GPU 166, dNPU 168, and iNPU 174.

Cloud data center 185 includes cloud gateway services 175, an information handling system 176, and an AI server 180. Cloud data center 185 may also include one or more racks that house information handling systems. In addition, other cloud data centers aside from cloud data center 185 may also be included as part of the cloud. In another embodiment, cloud gateway services 175 may be hosted by information handling system 176 or AI server 180. One or both of information handling system 176 and AI server 180 may be a physical or a virtual computing device. Cloud gateway services 175 includes a cloud workload orchestrator 184, an ITDM portal 186, a workspace reservation data store 188, IT policy 182, and applications 190 and 192. Applications 190 and 192 are applications installed remotely on cloud gateway service 175, also referred to as on-the-cloud (OTC) applications. These applications may be discrete application entities, or they may work in conjunction with OTB applications of information handling systems within the network, such as applications 102 and 104.

Cloud workload orchestrator 184 may comprise any system, device, or apparatus configured to run an AI workload on an available cloud computer, which can be in a private cloud, or a cloud computing platform based on an IT policy. ITDM portal 186 may comprise any system, device, or apparatus configured to allow an ITDM or a user to set policy on distributed system environment 100 as a whole, a set of information handling systems, or an individual information handling system. ITDM portal 186 also allows the ITDM to participate in the allocation of the information handling systems or resources in distributed system environment 100. In addition, ITDM portal 186 further allows the ITDM, user, or cloud workload orchestrator 184 to look up forthcoming workspace reservations and decide where a machine learning model, a deep learning model, an AI workload, or similar should be run.

Workspace reservation data store 188 may comprise any system, device, or apparatus configured to allow cloud gateway services 175 to store and retrieve data, such as workspace reservations. In one embodiment, workspace reservation data store 188 may be similar to data storage 108. For example, workspace reservation data store 188 may include a magnetic hard disk storage drive or a solid-state storage drive. In certain embodiments, workspace reservation data store 188 may be a cloud system of storage devices that is accessible via network. Further workspace reservation data store 188 may include a database or a collection of files that is a central repository of data associated with workspace reservations that are accessible by cloud workload orchestrator 184, ITDM portal 186, and/or applications 190 and 192. For example, cloud workload orchestrator 184 may retrieve, store, and utilize data stored in workspace reservation data store 188 via ITDM portal 186.

In modern enterprises, the term "hoteling," shared workspaces, or co-working spaces collectively refer to physical environments where clients, users, or employees can schedule their hourly, daily, or weekly use of individual spaces, such as office desks, cubicles, or conference rooms, thus serving as an alternative to conventional, permanently assigned seating. In some cases, hoteling clients, users, or employees access a reservation system to book an individual space, such as a desk, a cubicle, a conference room, an office, etc. before they arrive at work, which gives them the freedom and flexibility to work wherever they want to. Each workspace may include its own set of peripheral devices or components, such as displays, webcams, microphones, speakers, headsets, printers, etc. When a client, user, or employee reaches the workspace, they typically bring their individual information handling system, connect their information handling system to a dock or docking station, and integrate with the set of peripheral devices or components.

Shared workspaces and computer equipment can be preconfigured based on location or utility. In today's work from home environment, employees infrequently visit office buildings. Cubicles, desks, and their accompanying computer equipment are thus shared by different employees in a hoteling arrangement. An employee can typically reserve a workspace using a portal online to select the workspace based on various factors, such as building, team locality, hardware, and length of time for usage. An example of a workspace reservation is shown below:

```
{
  "User": "FirstName_LastName",
  "Start_Time": "2024/08/30 13:00:00 -05:00"
  "End_Time": "2024/08/30 18:00:00 -5:00"
  "Country": "United States",
  "State": "Texas",
  "City": "Austin",
  "Office_Code": "12345-3-1"
  "Workspace_Code": "PS3-2-134-1"
}
```

When the employee arrives at the cubicle, desk, or other workspace, the employee's smartphone and laptop computer may be provisioned via wired or wireless network, such as WI-FI®, BLUETOOTH®, and other wireless networks serving the workspace. For example, provisioning may include FW/SW management services 152 determining whether there is an upcoming workspace reservation and whether there is an AI workload to be processed associated with the workspace reservation. The processing of the AI workload can also be triggered when the employee logs in. The devices or information handling system associated with the workspace reservation may also be pre-provisioned prior to the employee logging in. As such, the AI workload can be processed before the employee logs in. This enables optimization of the AI workload offload procedure.

IT policy 182 may comprise an IT policy or a set of IT policies that may indicate whether a given AI workload is eligible for migration, for example, based upon contextual information indicative of a level of processing required for that workload (e.g., whether an offload allowed or not allowed based upon AI processing capability, location requirement, security requirement, etc.). In one example, IT policy 182 may be a global IT policy as shown below:

```
{
  "IncludeCompute": ["CPU", "GPU", "NPU"],
  "VideoWorkloads": "Disabled",
  "AudioWorkloads": "Enabled",
  "ExcludeDevicePattern": "Intel ® iGPU*"
}
```

The above policy may enable the use of CPU, GPU, and NPU on the information handling systems included in distributed system environment 100 that the ITDM manages, such as information handling system 135 and 160, and device 150. According to this policy, video workloads would be disabled on the information handling systems and devices. However, this policy allows audio workloads. In this example, the IT policy would limit the use of the CPU, GPU, and NPU to clean up a meeting video but would allow the use of the CPU, GPU, and NPU to participate in cleaning up audio associated with the meeting.

In general, computer networks are considered to be trusted according to some rules, such as: a. by default, provisioned information handling systems under the purview of an organization's information technology (IT) department are trusted by each other for many corporate information handling system users, and b. by default, multiple systems registered with the same account are considered to be trusted for non-corporate users. IT administrators have the ability to create smaller groups within their organization, such as engineering computing devices, workstations, etc. to trust other engineering computing devices or workstations, according to the organization's policy. For example, IT policy 182 may be configured as an engineering system group policy for a specific set or group of information handling systems as shown below:

```
{
  "LocalWorkloads": {
    "Never": {
      "ApplicationList": ["Visual Studio", "Creo"]
    },
    "NPUAvailable": {
      "ApplicationList": ["Teams ®", "Zoom ®", "VSCode ®"]
    }
  }
}
```

The above policy may apply to a set or group of information handling systems in an engineering domain that an ITDM manages. This policy may be configured to control when an AI workload can be run locally in one or more information handling systems in the engineering domain. In this example, local AI workloads may not be run locally if an end user is running a Visual Studio® or Creo® application. On the other hand, if the end-user is running Teams®, Zoom®, or VSCode®, then local AI workloads may run when there is a local NPU available.

In various embodiments, distributed system environment 100 may not include each of the components shown in FIG. 1. Additionally, or alternatively, distributed system environment 100 may include various additional components to those shown in FIG. 1. Furthermore, some components that are represented as separate components in FIG. 1 may in certain embodiments be integrated with other components. For example, in certain embodiments, all or a portion of the illustrated components may instead be provided by components integrated into one or more processors, such as a SOC.

FIG. 1 is annotated with a series of letters A-G. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

Prior to stage A, upon detecting a connection of information handling system 135 to device 150, embedded controller 147 may cooperate with embedded controller 157 establish an initial connection and manage a source-to-sink connection between embedded controller 147 and embedded controller 157. Embedded controller 147 may communicate with embedded controller 157 via a sideband connection using a pre-defined communication protocol using vendor-defined messages via a configuration channel (CC) line. Embedded controller 147 and embedded controller 157 share their capabilities, such as workload sizing, number and type of NPUs, etc., securely through the sideband interface.

At stage A, application 102 may request a workload to be run, such as AI workload 115 on a specific AI model or language model, and provide data inputs. Application 102 may submit this request to AI workload orchestrator 110. At stage B, AI workload orchestrator 110 may direct device selection service 112 to select the docking station, and device 150 to run the workload. In this example, device selection service 112 selects device 150 to run AI workload 115 instead of a processor of information handling system 135 based on one or more factors, such as the NPUs of information handling system 135 are busy processing other workloads.

At stage C, firmware management service 116 may configure device 150 via embedded controller 157 to run AI workload 115 before offloading the workload. As such, firmware management service 116 may provide embedded controller 157 information associated with AI workload 115, such as an AI model or language model to be used to run AI workload 115, one or more hyperparameters for the AI model or language model behavior, secure connection information, requested computing device to execute AI workload 115, etc. For example, firmware management service 116 may identify a particular AI model or language model to execute AI workload 115. FW/SW management services 162 may determine which execution unit to run the workload. For example, FW/SW management services 162 may determine to use GPU 154 for running AI workload 115. The hyperparameters can be adjustable settings or configurations set by application 102 and/or a user instead of learned from data.

At stage D, embedded controller 157 device 150 may register the configuration and create a job identifier for AI workload 115 after device 150 accepts the request to execute AI workload 115. Device 150 may provide the job identifier to firmware management service 116. At stage E, firmware management service 116 may send the job identifier and the data inputs to device 150 over a primary connection between information handling system 135 and device 150.

At stage F, FW/SW management services 152 of device 150 may apply the workload configuration and direct one of GPU 154 and dNPU 158 to execute AI workload 115. FW/SW management services 152 may return the results of the execution of AI workload 115 to AI workload orchestrator 110 via firmware management service 116. At stage G, AI workload orchestrator 110 may return the results to application 102.

Those of ordinary skill in the art will appreciate that the configuration, hardware, and/or software components of distributed system environment 100 depicted in FIG. 1 may vary. For example, the illustrative components within distributed system environment 100 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 2:
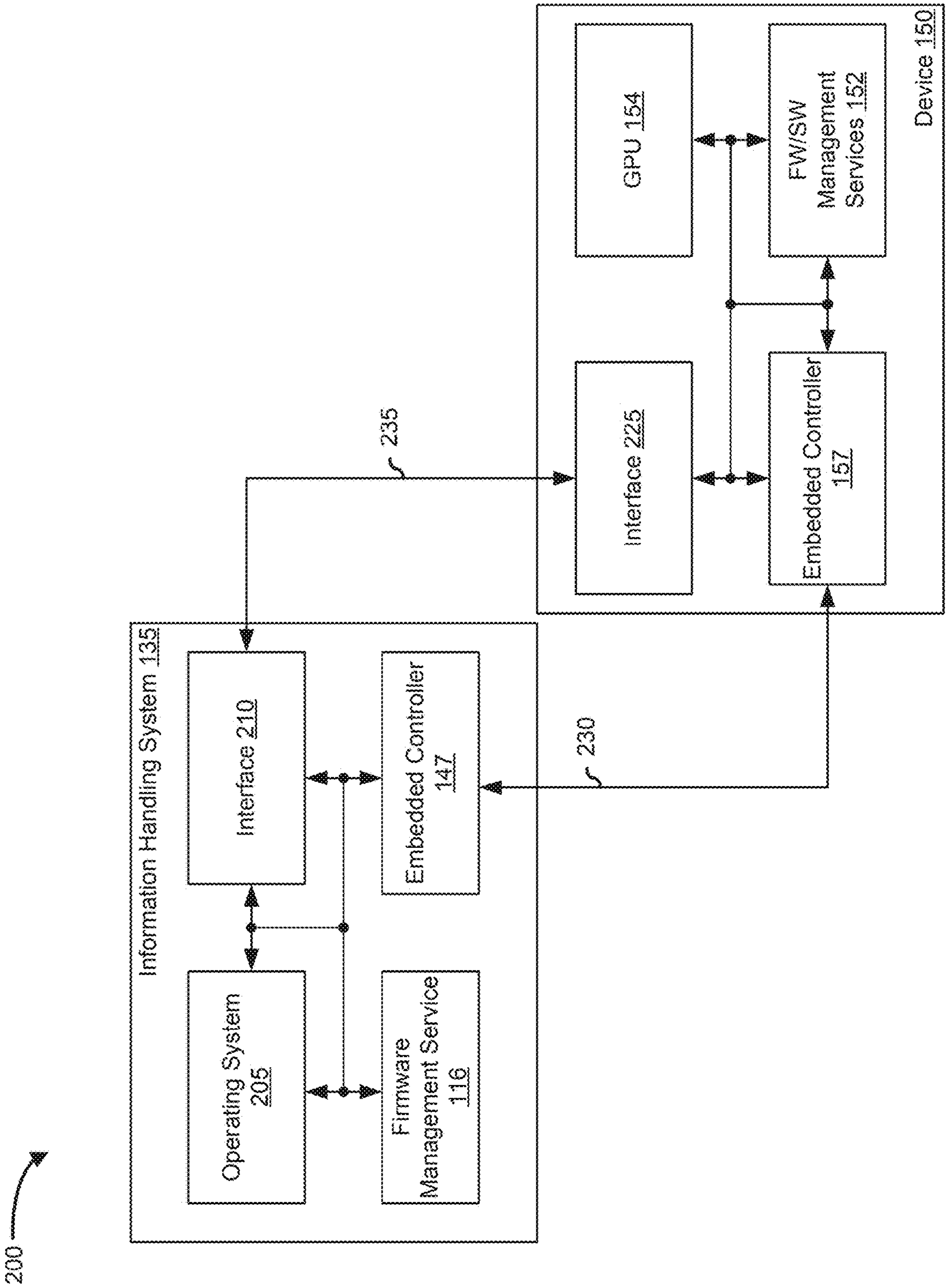
FIG. 2 is a block diagram of a system for client workload sharing with an NPU enabled dock, according to an embodiment of the present disclosure.

FIG. 2 illustrates a portion of a system 200 for client workload sharing with an NPU enabled dock, according to an embodiment of the present disclosure. System 200, which may be a sub-system of distributed system environment 100 of FIG. 1, includes information handling system 135 and device 150. Information handling system 135 includes an operating system 205, an interface 210, a firmware management service 116, and embedded controller 147. Device 150 includes an interface 225, GPU 154, FW/SW management services 152, and embedded controller 157.

Embedded controller 147 may be connected to embedded controller 157. Information handling system 135 may be connected to device 150 via primary connection 235 through interface 210 and interface 225. Operating system 205 may be communicatively coupled to firmware management service 116 and embedded controller 147. FW/SW management services 152 may be communicatively coupled to embedded controller 157, GPU 154, and interface 225.

However, any variety of connections between components of information handling system 135 and device 150 are envisioned as falling within the scope of the present disclosure. In addition, connections between components may be omitted for descriptive clarity. The operations described herein as being performed by one or more components of information handling system 135, such as firmware management service 116 may be performed or executed by a processor such as CPU 136 of FIG. 1. Similarly, a processor associated with device 150 may perform any suitable operations associated with one or more components of device 150, such as FW/SW management services 152.

Information handling system 135, which is similar to information handling system 500 of FIG. 5, may be a portable information handling system with docking connectors that enable the system to be connected to, or docked with, a docking station, such as device 150 via a primary connection 235. Primary connection 235 may be established via an interface 225 which may be a Universal Serial Bus (USB) port, such as USB 3.0, USB4, or similar. Accordingly, information handling system 135 may communicate with device 150, such as sending and receiving data, using high throughput communication protocols like USB 3.0 or USB4 protocols. Primary connection 235 may also be used in charging the information handling system, providing power and video stream to one or more display monitors, providing power and audio stream to speakers, etc. In addition to supplying power to information handling system 135, device 150 may provide information handling system 135 with additional functionality such as connecting to a monitor, printer, and wired or wireless network. In addition, device 150 may execute a workload for information handling system 135. Accordingly, it would be desirable to have a system and method to establish a trust relationship between information handling system 135 and device 150 as provided herein.

Information handling system 135 may include an embedded controller 147, which is similar to a BMC 590 of FIG. 5. Embedded controller 147 of information handling system 135 may be configured to provide sideband access to embedded controller 157 of device 150 via a sideband connection 230 in addition to or separate from primary connection 235 between device 150 and information handling system 135. Sideband access provides access to operations that are separate from primary operations or functions of device 150, such as transmitting large amount of data, providing power and/or data to peripheral devices, etc. Sideband connection 230 may be provided by an Inter-Integrated Circuit ($I^2C$) sideband bus and/or other sideband communication interface. Sideband connection 230 may also be a Bluetooth®, near-field communication, or similar. Embedded controller 147 may establish a connection with embedded controller 157 via a configuration channel (CC) line. In particular pins CC1 and CC2 may be used to establish and manage a source-to-sink connection. The CC channel may be used to establish an initial connection between device 150 and information handling system 135 and to assign workloads to device 150. As such, embedded controller 147 may utilize sideband connection 230 to configure a workload and create a job. Embedded controller 157 may transmit configuration information that would allow device 150 to execute a workload.

Figure 3:
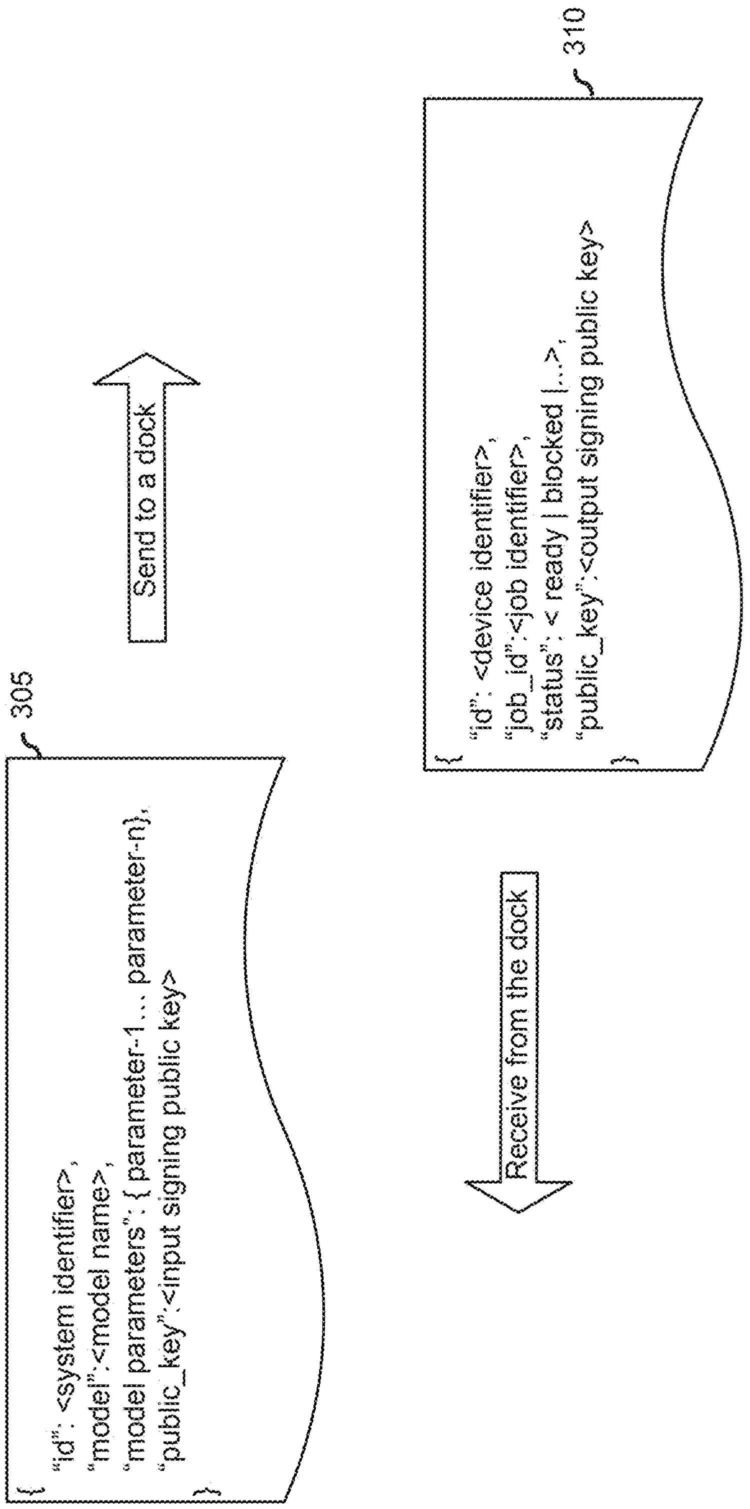
FIG. 3 is a diagram of data for client workload sharing with an NPU enabled dock, according to an embodiment of the present disclosure.

FIG. 3 illustrates a portion of a data set 305 and a data set 310 for client workload sharing with an NPU enabled dock, according to an embodiment of the present disclosure. Data set 305 includes information that information handling system 135 of FIG. 1 may send to device 150 of FIG. 1 when offloading a workload, such as AI workload 115 of FIG. 1. For example, data set 305 includes a system identifier, a model name, a model parameter, and a public key. The system identifier may identify the information handling system that offloaded the workload. The model name may identify an AI model or language model to be used when executing the workload. The model parameters may indicate parameter values to be used for the execution of the workload. The public key may be used to sign data set 305 for verification of data set 305 by device 150 of FIG. 1 prior to the execution of the workload.

Data set 310 includes information that device 150 of FIG. 1 may send to information handling system 135 of FIG. 1 after execution of the workload. Data set 310 includes a device identifier, a job identifier, a status, and a public key. The device identifier may identify which device executed the workload. For example, the device identifier may include a unique vendor identifier or serial number of device 150 of FIG. 1. Job identifier may indicate a unique identifier associated with the execution of the workload. The status may indicate a current status of the execution of the workload, which may include, ready, blocked, success, fail, etc. The public key may be used to sign data set 310 for verification of data set 310 by information handling system 135 of FIG. 1.

Figure 4:
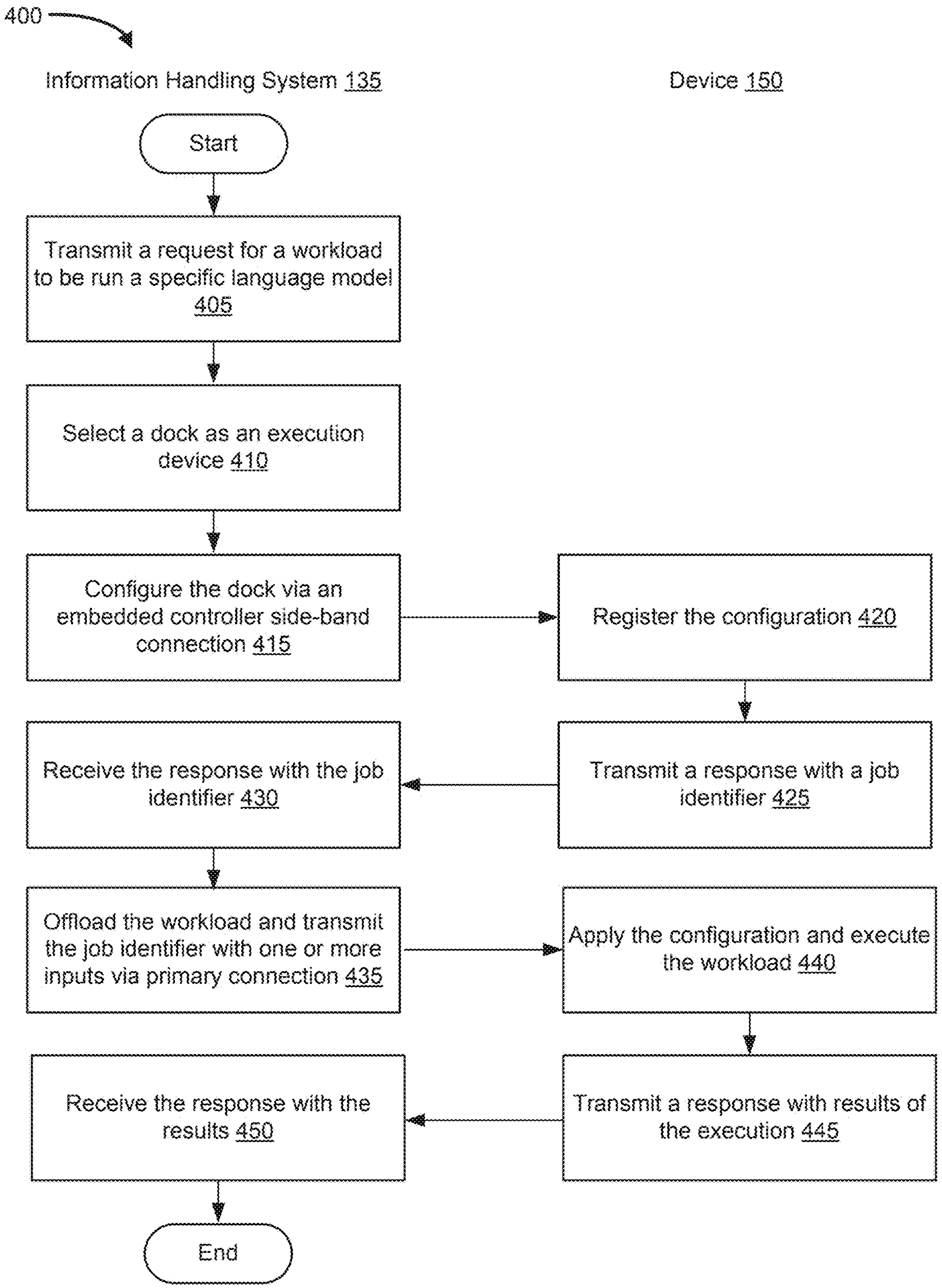
FIG. 4 is a flowchart of a method for client workload sharing with an NPU enabled dock, according to an embodiment of the present disclosure.

FIG. 4 illustrates a method 400 for client workload sharing with an NPU enabled dock, according to an embodiment of the present disclosure. Method 400 may be performed by any suitable component of distributed system environment 100 of FIG. 1 including, but not limited to embedded controller 147 and embedded controller 157 of FIG. 1. While embodiments of the present disclosure are described in terms of the components of distributed system environment 100 of FIG. 1, it should be recognized that other components may be utilized to perform the described method. One of skill in the art will appreciate that this flow chart explains a typical example, which can be extended to applications or services in practice. In addition, it will be readily appreciated that not every block set forth in this flow chart is always necessary and that certain blocks may be combined, performed simultaneously, in a different order, or perhaps omitted, without varying from the scope of the disclosure. In addition, while embodiments of the present disclosure are described in terms of distributed system environment 100 of FIG. 1, it should be recognized that other systems may be utilized to perform the described method.

Method 400 typically starts at block 405 where an application of information handling system 135 may request an AI workload orchestrator to run an AI workload on a specific AI model or language model using a set of data inputs. For example, a teleconferencing application may request a summarized content of a virtual meeting by providing an audio stream and a video stream. In a particular example, application 102 of FIG. 1 may request AI workload orchestrator 110 of FIG. 1 to AI workload 115 of FIG. 1 to be run using a specific AI model or language model. The method may proceed to block 410.

At block 410, a device selection service, such as device selection service 112 of FIG. 1 may select a dock as an execution device. The device selection service may select the dock, such as device 150 based on one or more factors, such as a current temperature of the client computing device and/or whether the user of the client computing device opted to offload AI workloads to the dock. The method may proceed to block 415.

At block 415, a firmware management service may configure the dock via a sideband connection of an embedded controller of information handling system 135 with an embedded controller of device 150. For example, firmware management service 116 may configure device 150 as the execution device for AI workload 115 of FIG. 1, via embedded controller 147 of FIG. 1. Embedded controller 147 of FIG. 1 may use a sideband connection with embedded controller 157 of FIG. 1 to transmit configuration information. The method may proceed to block 420.

At block 420, the embedded controller of device 150 may register the configuration received from information handling system 135. A job identifier may be generated and associated with the configuration. The method may proceed to block 425. At block 425, the embedded controller of device 150 may transmit a response to the embedded controller of information handling system 135 via the sideband connection. The response may include a job identifier. The method may proceed to block 430. At block 430, the embedded controller of information handling system 135 may then provide the job identifier to the firmware management service of information handling system 135. The method may proceed to block 435.

At block 435, the firmware management service of information handling system 135 may offload the AI workload to FW/SW management services of device 150 via a primary connection between information handling system 135 and device 150. Offloading the workload includes transmitting the job identifier with one or more data inputs to device 150. The method may proceed to block 440. At block 440, the FW/SW management service of device 150 may apply the configuration for executing the AI workload. In addition, the FW/SW management service may direct an execution unit, such as GPU 154 of FIG. 1 to execute the AI workload. The method may proceed to block 445. At block 445, the FW/SW management service of device 150 may transmit a response to information handling system 135 via the primary connection. The response may include the job identifier and results of the execution. The method may proceed to block 450. At block 450, the firmware management service of information handling system 135 may receive the response along with the job identifier and the results of the execution of the AI workload. Afterwards, the method ends.

FIG. 5 illustrates an embodiment of an information handling system 500 including processors 502 and 504, a chipset 510, a memory 520, a graphics adapter 530 connected to a video display 534, a non-volatile RAM (NVRAM) 540 that includes a basic input and output system/extensible firmware interface (BIOS/EFI) module 542, a disk controller 550, a hard disk drive (HDD) 554, an optical disk drive 556, a disk emulator 560 connected to an SSD 564, an I/O interface 570 connected to an add-on resource 574 and a trusted platform module (TPM) 576, a network interface 580, and a baseboard management controller (BMC) 590. Processor 502 is connected to chipset 510 via processor interface 506, and processor 504 is connected to the chipset via processor interface 508. In a particular embodiment, processors 502 and 504 are connected together via a high-capacity coherent fabric, such as a HyperTransport link, a QuickPath Interconnect, or the like. Chipset 510 represents an integrated circuit or group of integrated circuits that manage the data flow between processors 502 and 504 and the other elements of information handling system 500. In a particular embodiment, chipset 510 represents a pair of integrated circuits, such as a northbridge component and a southbridge component. In another embodiment, some or all of the functions and features of chipset 510 are integrated with one or more of processors 502 and 504.

Memory 520 is connected to chipset 510 via a memory interface 522. An example of memory interface 522 includes a Double Data Rate (DDR) memory channel and memory 520 represents one or more DDR Dual In-Line Memory Modules (DIMMs). In a particular embodiment, memory interface 522 represents two or more DDR channels. In another embodiment, one or more of processors 502 and 504 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 520 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 530 is connected to chipset 510 via a graphics interface 532 and provides a video display output 536 to a video display 534. An example of a graphics interface 532 includes a Peripheral Component Interconnect-Express (PCIe) interface and graphics adapter 530 can include a four-lane (×4) PCIe adapter, an eight-lane (×8) PCIe adapter, a 16-lane (×16) PCIe adapter, or another configuration, as needed or desired. In a particular embodiment, graphics adapter 530 is provided down on a system printed circuit board (PCB). Video display output 536 can include a Digital Video Interface (DVI), a High-Definition Multimedia Interface (HDMI), a DisplayPort interface, or the like, and video display 534 can include a monitor, a smart television, an embedded display such as a laptop computer display, or the like.

NVRAM 540, disk controller 550, and I/O interface 570 are connected to chipset 510 via an I/O channel 512. An example of I/O channel 512 includes one or more point-to-point PCIe links between chipset 510 and each of NVRAM 540, disk controller 550, and I/O interface 570. Chipset 510 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface, a Universal Serial Bus (USB), another interface, or a combination thereof. NVRAM 540 includes BIOS/EFI module 542 that stores machine-executable code (BIOS/EFI code) that operates to detect the resources of information handling system 500, to provide drivers for the resources, to initialize the resources, and to provide common access mechanisms for the resources. The functions and features of BIOS/EFI module 542 will be further described below.

Disk controller 550 includes a disk interface 552 that connects the disc controller to an HDD 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an institute of electrical and electronics engineers (IEEE) 1394 (Firewire) interface, a proprietary interface, or a combination thereof. Alternatively, SSD 564 can be disposed within information handling system 500.

I/O interface 570 includes a peripheral interface 572 that connects the I/O interface to add-on resource 574, to TPM 576, and to network interface 580. Peripheral interface 572 can be the same type of interface as I/O channel 512 or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral interface 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on a separate circuit board, or add-in card disposed within information handling system 500, a device that is external to the information handling system, or a combination thereof.

Network interface 580 represents a network communication device disposed within information handling system 500, on a main circuit board of the information handling system, integrated onto another component such as chipset 510, in another suitable location, or a combination thereof. Network interface 580 includes a network channel 582 that provides an interface to devices that are external to information handling system 500. In a particular embodiment, network channel 582 is of a different type than peripheral interface 572 and network interface 580 translates information from a format suitable to the peripheral channel to a format suitable to external devices.

In a particular embodiment, network interface 580 includes a NIC or host bus adapter (HBA), and an example of network channel 582 includes an InfiniBand channel, a Fibre Channel, a Gigabit Ethernet channel, a proprietary channel architecture, or a combination thereof. In another embodiment, network interface 580 includes a wireless communication interface, and network channel 582 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 582 can be connected to an external network resource (not illustrated). The network resource can include another information handling system, a data storage system, another network, a grid management system, another suitable resource, or a combination thereof.

BMC 590 is connected to multiple elements of information handling system 500 via one or more management interface 592 to provide out-of-band monitoring, maintenance, and control of the elements of the information handling system. As such, BMC 590 represents a processing device different from processor 502 and processor 504, which provides various management functions for information handling system 500. For example, BMC 590 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 590 can vary considerably based on the type of information handling system. BMC 590 can operate in accordance with an Intelligent Platform Management Interface (IPMI). Examples of BMC 590 include an Integrated Dell® Remote Access Controller (iDRAC).

Management interface 592 represents one or more out-of-band communication interfaces between BMC 590 and the elements of information handling system 500 and can include an Inter-Integrated Circuit ($I^2C$) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 500, that is apart from the execution of code by processors 502 and 504 and procedures that are implemented on the information handling system in response to the executed code.

BMC 590 operates to monitor and maintain system firmware, such as code stored in BIOS/EFI module 542, option ROMs for graphics adapter 530, disk controller 550, add-on resource 574, network interface 580, or other elements of information handling system 500, as needed or desired. In particular, BMC 590 includes a network interface 594 that can be connected to a remote management system to receive firmware updates, as needed or desired. Here, BMC 590 receives the firmware updates, stores the updates to a data storage device associated with the BMC, and transfers the firmware updates to the NVRAM of the device or system that is the subject of the firmware update, thereby replacing the currently operating firmware associated with the device or system, and reboots information handling system, whereupon the device or system utilizes the updated firmware image.

BMC 590 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 590, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a “F2” boot option, or another protocol or API, as needed or desired.

In a particular embodiment, BMC 590 is included on a main circuit board (such as a baseboard, a motherboard, or any combination thereof) of information handling system 500 or is integrated into another element of the information handling system such as chipset 510, or another suitable element, as needed or desired. As such, BMC 590 can be part of an integrated circuit or a chipset within information handling system 500. An example of BMC 590 includes an iDRAC, or the like. BMC 590 may operate on a separate power plane from other resources in information handling system 500. Thus BMC 590 can communicate with the management system via network interface 594 while the resources of information handling system 500 are powered off. Here, information can be sent from the management system to BMC 590 and the information can be stored in a RAM or NVRAM associated with the BMC. Information stored in the RAM may be lost after power-down of the power plane for BMC 590, while information stored in the NVRAM may be saved through a power-down/power-up cycle of the power plane for the BMC.

Information handling system 500 can include additional components and additional buses, not shown for clarity. For example, information handling system 500 can include multiple processor cores, audio devices, and the like. While a particular arrangement of bus technologies and interconnections is illustrated for the purpose of example, one of skill will appreciate that the techniques disclosed herein are applicable to other system architectures. Information handling system 500 can include multiple central processing units (CPUs) and redundant bus controllers. One or more components can be integrated together. Information handling system 500 can include additional buses and bus protocols, for example, $I^2C$ and the like. Additional components of information handling system 500 can include one or more storage devices that can store machine-executable code, one or more communications ports for communicating with external devices, and various input and output (I/O) devices, such as a keyboard, a mouse, and a video display.

For purposes of this disclosure, information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as processor 502, a programmable logic array (PLA), an embedded device such as a System-on-a-Chip (SoC), or other control logic hardware. Information handling system 500 can also include one or more computer-readable media for storing machine-executable code, such as software or data.

Although FIG. 4 shows example blocks of method 400 in some implementations, method 400 may include additional blocks, fewer blocks, different blocks, or differently arranged blocks than those depicted in FIG. 4. Those skilled in the art will understand that the principles presented herein may be implemented in any suitably arranged processing system. Additionally, or alternatively, two or more of the blocks of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

selecting, by a processor of an information handling system, a docking station to execute a workload on an artificial intelligence (AI) model while the information handling system is docked at the docking station;

in response to the selecting of the docking station, configuring the docking station to execute the workload on the AI model using a sideband connection between the information handling system and the docking station;

subsequent to the configuring of the docking station using the sideband connection, offloading the workload to the docking station via a primary connection between the information handling system and the docking station while the information handling system is docked at the docking station; and receiving results of the workload from the docking station via the primary connection.

2. The method of claim 1, wherein the sideband connection is between a first embedded controller of the information handling system and a second embedded controller of the docking station.

3. The method of claim 1, wherein the sideband connection includes a configuration channel to establish a source-to-sink connection between the information handling system and the docking station.

4. The method of claim 1, wherein the primary connection is a universal serial bus connection.

5. The method of claim 1, wherein the docking station includes a neural processing unit to execute the workload.

6. The method of claim 1, wherein the configuring of the docking station includes information identifying an artificial intelligence model to be used for the workload.

7. The method of claim 1, further comprising receiving a job identifier from the docking station subsequent to the configuring of the docking station to execute the workload.

8. The method of claim 7, wherein the job identifier is transmitted via the sideband connection.

9. An information handling system, comprising:

a processor; and a memory coupled to the processor, the memory having program instructions stored thereon that upon execution cause the processor to:

select a docking station to execute a workload on an artificial intelligence (AI) model while the information handling system is docked at the docking station;

in response to the selection of the docking station, configure the docking station to execute the workload on the AI model using a sideband connection between the information handling system and the docking station;

subsequent to the configuration of the docking station using the sideband connection, offload the workload to the docking station via a primary connection between the information handling system and the docking station while the information handling system is docked at the docking station; and receive results of the workload from the docking station via the primary connection.

10. The information handling system of claim 9, wherein the sideband connection is between a first embedded controller of the information handling system and a second embedded controller of the docking station.

11. The information handling system of claim 9, wherein the sideband connection includes a configuration channel to establish a source-to-sink connection between the information handling system and the docking station.

12. The information handling system of claim 9, wherein the primary connection is a universal serial bus connection.

13. The information handling system of claim 9, wherein the docking station includes a neural processing unit to execute the workload.

14. The information handling system of claim 9, wherein the configuration of the docking station includes information identifying an artificial intelligence model to be used for the workload.

15. A non-transitory computer-readable medium to store instructions that are executable to perform operations comprising:

selecting a docking station to execute a workload on an artificial intelligence (AI) model while an information handling system is docked at the docking station;

in response to the selecting of the docking station, configuring the docking station to execute the workload on the AI model using a sideband connection between an information handling system and the docking station;

subsequent to the configuring of the docking station using the sideband connection, offloading the workload to the docking station via a primary connection between the information handling system and the docking station while the information handling system is docked at the docking station; and receiving results of the workload from the docking station via the primary connection.

16. The non-transitory computer-readable medium of claim 15, wherein the sideband connection is between a first embedded controller of the information handling system and a second embedded controller of the docking station.

17. The non-transitory computer-readable medium of claim 15, wherein the sideband connection includes a configuration channel to establish a source-to-sink connection between the information handling system and the docking station.

18. The non-transitory computer-readable medium of claim 15, wherein the primary connection is a universal serial bus connection.

19. The non-transitory computer-readable medium of claim 15, wherein the configuring of the docking station includes information identifying an artificial intelligence model to be used for the workload.

20. The non-transitory computer-readable medium of claim 15, wherein the operations further comprise receiving a job identifier from the docking station subsequent to the configuring of the docking station to execute the workload.

* * * * *